Oct. 17, 1939.  A. NAGEL  2,176,507
ROLL FILM FOR A CASSETTE
Filed May 1, 1937
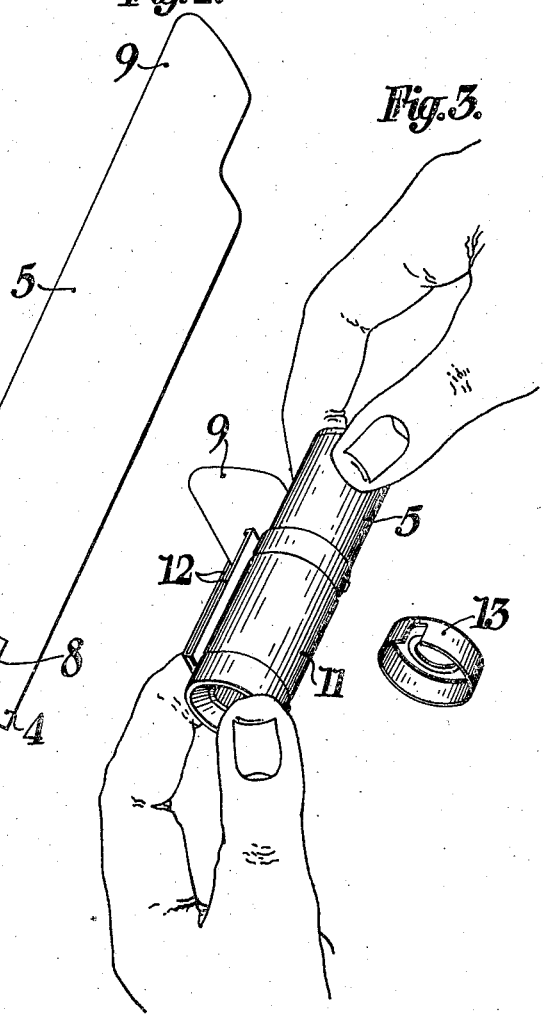
August Nagel,
INVENTOR
BY Newton M. Perius
George A. Gillette, Jr.
ATTORNEYS.

Patented Oct. 17, 1939

2,176,507

UNITED STATES PATENT OFFICE 2,176,507

ROLL FILM FOR A CASSETTE

August Nagel, Stuttgart, Germany, assignor to Eastman Kodak Company, Rochester, N. Y., a corporation of New Jersey Application May 1, 1937, Serial No. 140,234
In Germany October 26, 1936

1 Claim. (Cl. 95—9)

This invention relates to a roll film for a cassette, and more particularly to a leader strip for light sealing the roll film and also for facilitating the loading of said roll film into said cassette.

In the usual arrangement of a film cassette, the film is wound on a spool which is free to rotate in the cassette and the end of the film projects through a slot in the side of the cassette which slot may be provided with plush or other means of preventing light leaks. It has hitherto been possible to reload a cassette with film strips of greater or shorter lengths as desired. However, this had to be effected in a darkroom.

It is an object of the present invention to provide a method whereby photographic film may be loaded into a cassette in daylight.

It is also an object of the invention to provide a suitable cartridge of film whereby the above mentioned method may be carried out.

It is a particular object of the invention to provide a leader strip of light proof material which is attached to the end of a roll of film and wrapped thereon and which is provided with a convenient arrangement whereby the end of the leader strip may be threaded through the film exit slot of the cassette when the roll of film is inserted in the cassette. One embodiment of the invention also provides means of fastening this leader strip so that the roll of film will not become prematurely unwound and which will remain fastened until after the film is inserted in the cassette.

One embodiment of the invention and some variations of it, methods of fastening the leader strip to the film, a method of sealing the leader strip, and one method of loading the roll of film into a cassette are illustrated in the accompanying drawing in which similar reference characters designate similar elements and in which:

Fig. 1 is a side view showing a film spool of a still unused film strip with the outer end connected to and wrapped in the leader strip which comprises both the light-proofing layer and the means of threading the film into a cassette.

Fig. 2 shows a film spool with the film partially unwrapped and the leader strip, provided by the invention, attached to the end thereof.

Fig. 3 shows a film cassette with one end removed and a spool of film constructed according to the invention being inserted therein. Thus, the introduction of a replacement roll film is illustrated.

Fig. 4 shows one particular embodiment of the invention wherein the leader strip is provided with projections to engage one or more perforations in the film and the other end of the strip is provided with means to permit a secure grip to be obtained thereon.

In accordance with the invention the outer end of the light-proofing leader strip, which end serves as a pulling grip, is inserted into the film issuing slot of the cassette as the cassette is charged.

Referring now to the illustrated embodiments, a light sensitive film 2 is wound in the well-known manner on a film spool 1. The end 3 of the film strip 2 is shaped in the usual manner to permit easy loading in cameras of the type with which this film is to be used. This outer end 3 is intended for connection to or threading into the take-up spool in the camera.

According to the invention, the end 4 of a leader strip 5 which comprises a light-proof material is detachably connected in any suitable manner to the outer end 3 of the film 2. As shown in Fig. 2, the end 3 of the film may be mounted between the inner surface 6 of the strip 5 and a transverse strip 8 of any suitable material which may be fastened to the strip 5 except where the end 3 of the film 2 separates them. The area over which the transverse strip 8 is attached to the leader strip 5 is indicated at 7. The end 3 of the film 2 may be attached in any suitable manner such as by adhesive material to the surface 6 of the leader strip 5 or to the transverse strip 8 or to both. Preferably the transverse strip 8 is made adhesive on one surface whereby it may be attached to both the film end 3 and the leader strip 5.

An alternative way of attaching the leader strip 5 to the film end 3 is shown in Fig. 4 wherein projections 14 are provided on the leader strip 5 to engage one or more of the perforations in the film end 3. I have found that it is usually preferable when using a leader strip having projections 14 to also use an adhesive transverse strip 8 so that a more secure attachment is obtained and the possibility of the film end 3 jamming in the film exit 12 of a cassette 11 is minimized. As another alternative, projections to engage some of the film perforations may be similarly provided on the transverse strip 8 rather than or as well as on the leader strip 5.

The outer end 9 of the leader strip 5 may have various shapes, for example it may taper or it may be partially cut away along one side as shown to provide a convenient place whereat the strip 5 may be attached to itself when the spool is rolled up as in Figure 1. A suitable sticker or adhesive means 10 is provided for this purpose. This arrangement of the means of fastening the end 9 permits this end 9 to protrude and to be inserted in the film issuing slot 12 of a cassette 11 when the film spool is being introduced thereinto. Adhesive means 10 provides only one of numerous methods which have been found satisfactory for fastening the leader strip near but sufficiently distant from its end to leave a grip tab. For example, an adhesive on the inner surface of the outer convolution of the leader strip would be a satisfactory equivalent. Fig. 3 shows the film cassette 11 with one end 13 removed to permit insertion of the film reel which is wrapped in leader strip 5.

The end 9 of the leader strip 5 may be roughened, ribbed, grooved, or provided with an adhesive for the purpose of affording a good grip or it may carry means for producing such effects. Fig. 4 shows an example of this wherein the end 9A of the leader strip 5 is provided with transverse ribs 15.

When loading a film cassette with a spool of film incorporating the present invention, the end 13 of the film cassette 11 is removed and the film spool inserted as shown in Fig. 3. Preferably end 9 of the leader strip 5 is threaded from the end of the cassette into the film issuing slot 12 as shown. The leader strip fastening means 10 may be removed before inserting the reel in the cassette and the leader strip end 9 in the slot 12 or it may be removed after the end 9 is partially so inserted. On the other hand, the sticker 10, or whichever equivalent and suitable means is used, may be left on until the cassette is loaded and the end 13 replaced thereon. The sticker 10 is then disengaged by a pull on the end 9 of the leader strip 5.

After the cassette 11 is so loaded and the end 13 replaced thereon, the leader strip 5 is completely withdrawn from the cassette through the slot 12 carrying the end 3 of the film 2 with it. As pointed out above, the transverse strip 8 prevents the end 3 from engaging or catching the edges of slot 12 as it passes therethrough. When the outer end 3 of the film 2 has been pulled out of the holder 11 to such an extent that it can be grasped conveniently the leader strip 5 and the transverse strip 8 are detached therefrom and the connection of the end 3 of the film 2 with the winding reel can then be made in the usual well-known manner.

Having thus described the invention, it is to be understood that it is not confined to the structure shown but is of the scope of the appended claim.

What I claim and wish to protect by Letters Patent of the United States is:

A device of the character described comprising a spool having opaque flanges, a roll of perforated film wound on the spool, and a covering strip having projections on one end thereof adapted to engage the perforations near the outer end of the film, means for detachably attaching said covering strip to said outer end, the attachment comprising at least in part the engagement of said projections with the perforations, said covering strip being detachably fastened to itself near and sufficiently distant from its outer end to provide a loose tab which may be gripped, said tab having a length less than one outer convolution of the roll and sufficiently great to provide both a threading portion to extend through a cassette throat and a gripping portion on the outer end.

AUGUST NAGEL.